United States Patent [19]

Imasaki

[11] Patent Number: 5,285,564

[45] Date of Patent: Feb. 15, 1994

[54] METHOD OF MAKING A MAGNETIC HEAD SUPPORT

[75] Inventor: Katsuhiro Imasaki, Kyoto, Japan

[73] Assignee: Suncall Corporation, Kyoto, Japan

[21] Appl. No.: 866,980

[22] Filed: Apr. 10, 1992

[51] Int. Cl.$^5$ .............................................. G11B 5/42
[52] U.S. Cl. ..................................... 29/603; 360/104
[58] Field of Search .................. 29/603, 417; 360/104, 360/107

[56] References Cited

U.S. PATENT DOCUMENTS 5,161,076 11/1992 Inumochi et al. ................ 29/603 X Primary Examiner—Carl E. Hall
Attorney, Agent, or Firm—Pollock, VandeSande & Priddy

[57] ABSTRACT

A decrease in the quality of parts constituting the magnetic head structure of a magnetic disk device is prevented and the degree of freedom of design for oscillation characteristics is increased.

A magnetic head support structure 10 comprising an attaching base portion 12 for a magnetic head at one end and a gimbals spring 14 at the other end which are connected by a load beam 13 is integrally produced by rolling a linear steel material to form a ribbon of profile cross-section, which is then punched or pressed from the lateral surface thereof.

1 Claim, 3 Drawing Sheets

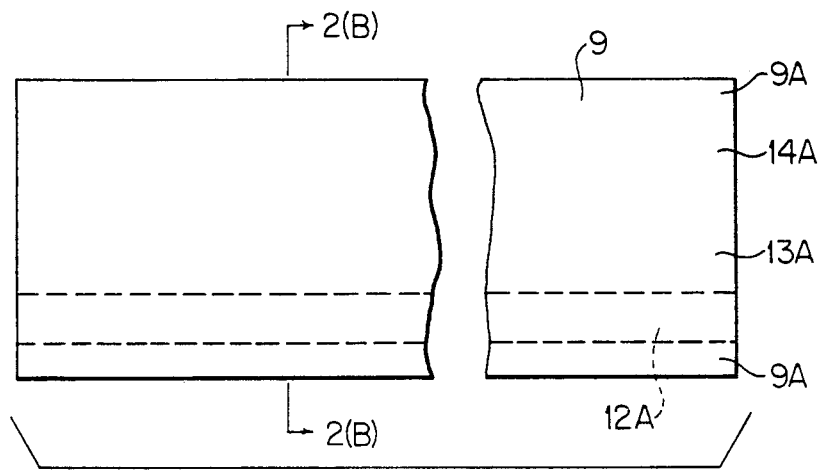 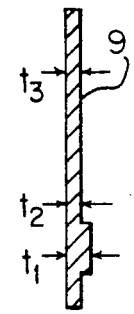
FIG. 2(A)  FIG. 2(B)
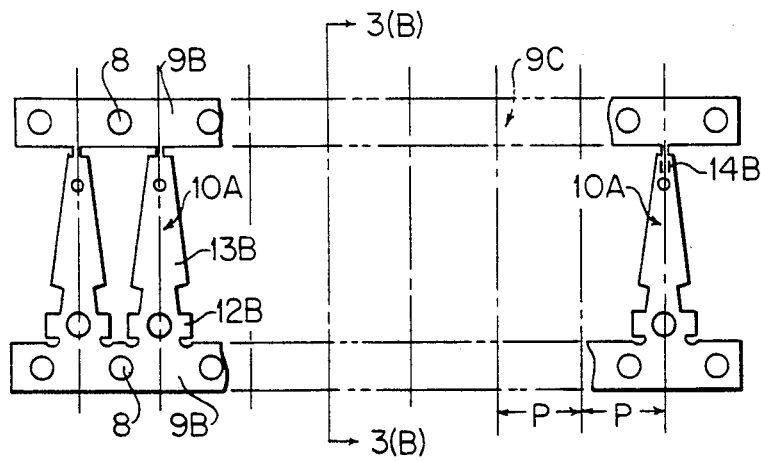 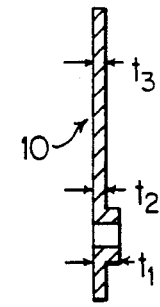
FIG. 3(A)  FIG. 3(B)

METHOD OF MAKING A MAGNETIC HEAD SUPPORT

BACKGROUND OF THE INVENTION

1. Field of the Invention

The present invention relates to a magnetic head support structure and a method of producing the same.

2. Prior Art

FIG. 5 is a plan view showing the construction of the principal portion of a magnetic disk device used in general. A magnetic head support structure 1 is assembled or produced by welding or fixing a thick base plate 2 mounted on a magnetic head arm, a load beam 3 in the form of a thin plate, and a gimbals spring 4 in the form of a thin plate for attaching a magnetic head slider. As shown in FIG. 4, in this magnetic head support structure 1, the base plate 2 is fixed to the front end of the swingably supported magnetic head arm 6, and the magnetic head slider 5 is bonded to the front end of the gimbals spring 4, thereby constituting the magnetic head. In addition, In FIG. 4, the numeral 7 denotes an actuator and CD denotes the magnetic head.

In the case where welding or crimping is employed as means for fixing the base plate 2, load beam 3 and gimbals spring 4, as described above, the assembling accuracy of the base plate 2, load beam 3 and gimbals spring 4 and the combined accuracy of the individual parts are cumulated, causing a problem that error in parallelism between parts, deviation of center or lengthwise deviation or twist as found in the completed magnetic head support structure exceeds the allowable limit. Therefore, the accuracy of the magnetic head support structure with respect to the magnetic disk CD lowers, with the result that the size of contact load on the magnetic disk CD varies, causing troubles to the reading of writing of information in accordance with the characteristics of the magnetic disk CD.

The aforesaid contact load is imparted by bending the load beam 3 and gimbals spring 4, and inequality of contact load is adjusted in the process subsequent to the assembling of parts. However, if such individual adjusting system is employed, additional processing steps, such as contact load adjustment, are required, adding to the number of processing steps, and the cost of magnetic disk devices soars.

Further, in assembling operation, in order to maintain the dimensional accuracy of the completed product within the allowable range, complicated positioning jigs are required, increasing the number of processing steps and making it difficult to save the installation cost.

SUMMARY OF THE INVENTION

As means for solving the above problems, the present invention proposes a magnetic head support structure characterized in that thin gimbals springs are each integrally formed such that the attaching base of a thick magnetic head is attached to one end of a load beam in the form of a thin plate and a magnetic head slider is attached to the other end and the invention also proposes a method of producing magnetic head support structures, comprising the steps of processing a linear steel material successively through pressure rolls and forming rollers to form a ribbon-like rolled steel material having a profile cross-section in which a thick attaching base forming portion, a thin load beam forming portion and a thin gimbals spring forming portion are continuously formed between tie bars at opposite ends and orthogonal to the rolling direction, lengthwise processing the lateral surface of said profile cross-section steel material to form an intermediate structure in which a number of magnetic head support structure elements are formed orthogonal to and between the tie bars at the opposite ends and juxtaposed with a predetermined pitch in which the attaching base portion, load beam portion and gimbals spring portion are connected on the same axis, subjecting said intermediate structure to forming process to curve the load beam portion while notching or cut-raising the gimbals spring portion at the magnetic head slider mounting position by press etching, and severing the plurality of magnetic head support structures from the tie bars at the opposite ends.

Thus, the magnetic head support structure is formed as an integral body with no welding portion between structural elements by means of profile cross-section rolling operation and press punching operation, thereby avoiding nonuniformity of accuracies of individual structural portions and combination of said accuracies.

BRIEF DESCRIPTION OF THE DRAWINGS

FIG. 2A is a plan view of a rolled steel material;

FIG. 2B is a longitudinal sectional view taken along the line II—II in FIG. 2A;

FIG. 3A is a plan view of an intermediate structure for the magnetic head support structure;

FIG. 3B is a longitudinal sectional view taken along the line III—III in FIG. 3A;

DESCRIPTION OF THE PREFERRED EMBODIMENTS

An embodiment of the invention will now be described with reference to FIGS. 1 through 3.

First, a ribbon-like profile cross-section rolled steel material 9 is produced by flatwise pressing a linear steel material by forming rolls and then rolling it successively through forming rolls, said rolled steel material 9 having a cross-sectional shape including, as shown in FIG. 2, an attaching base forming portion 12A having a somewhat great thickness $t_1$ to be mounted on a magnetic head arm 6, a gimbals spring 14 forming portion 14A having a thickness $t_3$ less than that of said attaching base forming portion 12A, a load beam forming portion 13A of thickness $t_2$ connecting said portions 12A and 14A, and tie bar forming portions 9A at the opposite ends, these portions being continuous with each other.

Then, as shown in FIG. 3, said ribbon-like profile cross-section rolled steel material is subjected to lengthwise press work starting with its lateral surface to form intermediate structures 9C disposed with a predetermined pitch distance P and orthogonal to tie bars portions 9B at the opposite ends with a number of magnetic head support structure elements 10A disposed parallel with each other in the rolling direction and each having an attaching base portion 12B, a load beam portion 13B and a gimbals spring portion 14B which are disposed on the same axis.

Figure 1A:
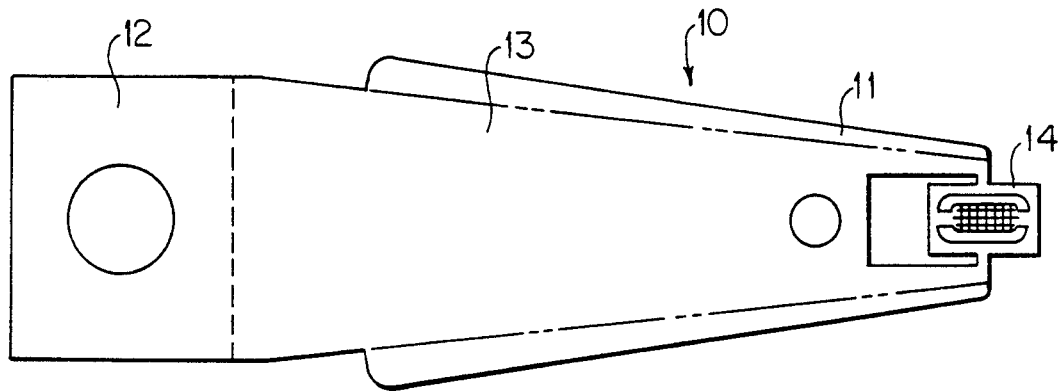
FIG. 1A is a plan view of a magnetic head support structure according to the present invention.
Figure 1B:
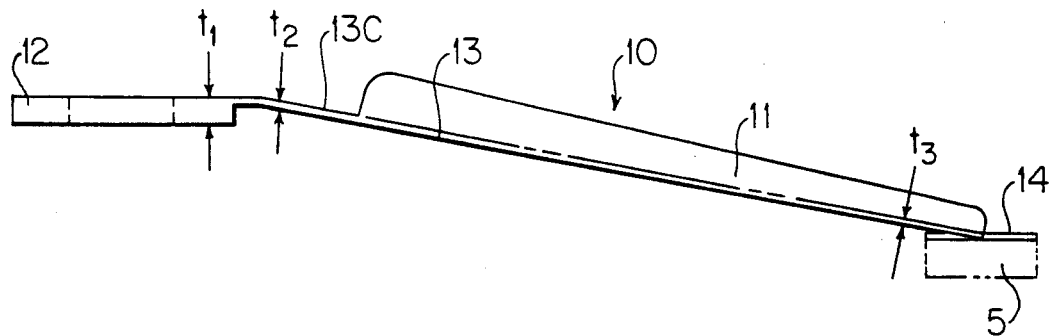
FIG. 1B is a side view of said magnetic head support structure.
Figure 4:
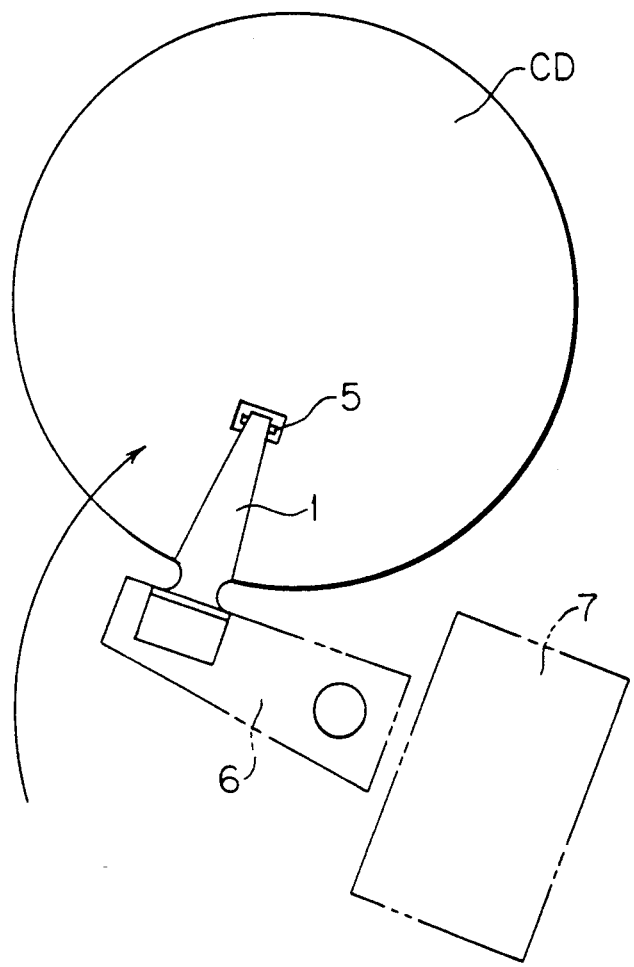
FIG. 4 is a schematic plan view of the magnetic head support structure.
Figure 5A:
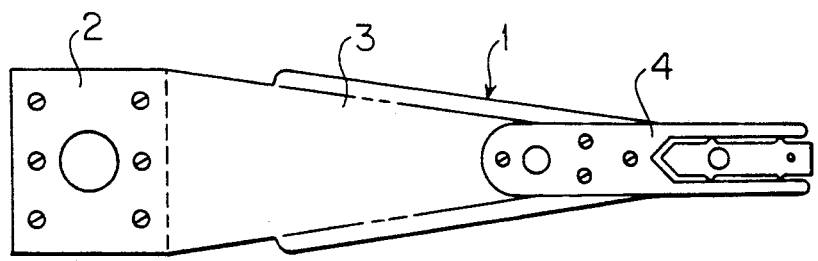
FIG. 5A is a plan view of a conventional magnetic head support structure.
Figure 5B:
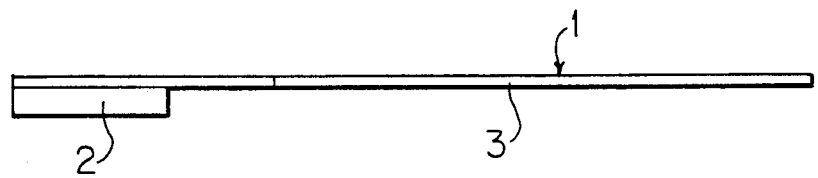
FIG. 5B is a side view of said conventional magnetic head support structure.

Then, the load beam portion 13B of the intermediate element 10A for said magnetic head support structure is bent in arch form at a predetermined position adjacent the attaching base portion 12B (as indicated by 13C in FIG. 1B). Concurrently therewith, the lateral edges 11 are bent upward lengthwise of the load beam portion 13B to form reinforcing edges, while the gimbals spring portion 14B is horizontally bent to form a portion for mounting a magnetic head slider 5 at the front end.

In addition, although the shape of the gimbals spring 14 varies with the type, slits are formed on opposite sides of the mounting portion shown hatched in FIG. 1 for elastically supporting the slider 5 and a U-shaped notch for cut-raising the gimbals spring 14 is formed in the front end of the load beam 13.

Finally, the elements 10A of the plurality of magnetic head support structures are severed from the tie bars 9B. In this manner, there are obtained magnetic head support structures 10 each integrally formed with an attaching base 12 to be mounted on the magnetic head arm 6, a load beam 1 and a gimbals spring 14. In integrally forming the magnetic head support structure 10 shown in the embodiment described above, the thickness of the load beam 13 is selected by taking the vibration characteristic (amplitude-natural frequency curve) of the magnetic head support structure 10 into consideration. For example, the thickness $t_2$ adjacent the attaching base portion 12 to the magnetic head arm 6 is made greater than the thickness $t_3$ of the gimbals spring 14 and the thickness of the load beam 13 can be varied lengthwise thereof so as to increase the natural frequency of the magnetic head support structure to thereby decrease the amplitude.

In addition, in the above embodiment, a description has been given of the case in which the thick magnetic head attaching base portion is substituted for an arrangement in which the base plate is superposed on the proximal end of the load beam; however, for a simple configuration in which the magnetic head arm extends coaxially with the load beam, this attaching base portion can be designed as an integral construction including a magnetic head arm to which the base plate is to be attached.

According to the present invention, since the magnetic head attaching base, the load beam and the gimbals spring are formed of a single steel material as an integral body, drawbacks are eliminated which are caused by nonuniformity in assembly, parts accuracy or combined parts quality or a decreases in productivity due to parts positioning operation or positional deviation correcting operation which has heretofore been a problem in a magnetic head support structure of the type in which parts are assembled by welding or crimping.

Further, the bending of load beams and the processing of gimbals springs are effected concurrently in large numbers while they are attached to the tie bars, the characteristics is made uniform and the number of processing steps is greatly reduced.

Further, because of rolling operation, the thickness of the load beam can be easily increased gradually from the front end to the proximal end, and it becomes possible to control the oscillation characteristics of the magnetic head support structure at the engineering design stage.

Further, since the magnetic head support structure is integrally formed including the magnetic head arm, a thin and small-sized product can be obtained.

What is claimed is:

1. A method of producing magnetic head support structures, comprising the steps of;

processing a linear steel material successively through pressure rolls and forming rollers to form rolled steel material ribbon having a profile cross-section in which a thick attaching base forming portion, a thin load beam forming portion and a thin gimbals spring forming portion are continuously formed between tie bars at opposite ends and orthogonal to the rolling direction, lengthwise processing a lateral surface of said profile cross-section steel material ribbon to form an intermediate structure in which a number of magnetic head support structure elements are formed orthogonal to and between the tie bars at the opposite ends and juxtaposed with a predetermined pitch in which the attaching base portion, load beam portion and gimbals spring portion are connected on the same axis, subjecting said intermediate structure to a forming process to curve the load beam portion while notching or cut-raising the gimbals spring portion at the magnetic head slider mounting position, and severing the plurality of magnetic head support structures from the tie bars at the opposite ends.

* * * * *